United States Patent [19]
Ramkumar

[11] Patent Number: 5,212,727
[45] Date of Patent: May 18, 1993

[54] QUEUING TRIGGER IN CALL PROCESSING

[75] Inventor: Vasant C. Ramkumar, Freehold, N.J.

[73] Assignee: AT&T Bell Laboratories, Murray Hill, N.J.

[21] Appl. No.: 589,724

[22] Filed: Sep. 26, 1990

[51] Int. Cl.⁵ ..................... H04M 7/00; H04M 11/00; H04M 15/00; H04M 3/00

[52] U.S. Cl. ..................................... 379/221; 379/92; 379/113; 379/266

[58] Field of Search ................ 379/265, 266, 92, 309, 379/113, 219, 221, 201, 207, 210

[56] References Cited

U.S. PATENT DOCUMENTS 4,737,983 4/1988 Frauenthal et al. ................ 379/265
4,788,715 11/1988 Lee ....................................... 379/84
4,907,260 3/1990 Prohs et al. ......................... 379/266
5,025,468 6/1991 Sikand et al. ...................... 379/266

Primary Examiner—Curtis Kuntz
Assistant Examiner—Harry S. Hong
Attorney, Agent, or Firm—B. H. Freedman

[57] ABSTRACT

A telecommunications switching system is disclosed which integrates intelligent network (IN) services with regular telephone services. A service control processor, which implements the IN services is also periodically made aware of regular network functions. The SCP then allocates resources for IN calls based upon not only the amount of IN calls, but rather, based upon the total network conditions; i.e. IN calls, regular telephone calls, faulty transmission lines, telephones taken off hook, etc.

3 Claims, 2 Drawing Sheets

QUEUING TRIGGER IN CALL PROCESSING

TECHNICAL FIELD

This invention relates to telecommunications switching equipment, and more particularly, to an improved method and apparatus for providing intelligent network (IN) services.

BACKGROUND OF THE INVENTION

Intelligent Network (IN) services is a generic term used to refer to any services in a telephone switch other than routing the call to a fixed physical location based upon the telephone number dialed. For example, a telephone switch could be programmed such that calls are forwarded to a different telephone number at particular times of the day, or such that multiple incoming calls to the same telephone number are each routed to different telephones. The switch could be programmed to bill the called party rather than the calling party (800 service), or to bill at a different rate (900 service). These and other variations of IN services are available currently.

One example of IN services can be appreciated by considering a large hotel chain which provides a nationwide, toll free number for customers desiring reservations. The hotel chain may have offices around the country, and each office may only be staffed at certain selected times or days. Further, busy hours at one office may occur simultaneously with relatively idle hours at another office, requiring that calls be rerouted depending upon the time of day. Nonetheless, it is desirable that all customers have one telephone number for all reservations, regardless of where the customer is located, what time of day it is, or which day of the week it is. Techniques to allow such a service are in existence currently, and are normally referred to as intelligent network (IN) services.

FIG. 1 shows a high level block diagram of an IN system including an exemplary corporate office 104, six telephones 105-110, two exemplary telephone switches 102-103, a local router 113, which may be a Private Branch Exchange (PBX) of the type well known in the art, and a service control processor (SCP) 101. Each of the telephones 105-110 would be manned by a service representative, and the particular one of telephones 105-110 that the call is routed to is substantially immaterial once the call is routed to the proper corporate office.

Considering the hotel chain example, each switch includes a set of software programs which recognize that an incoming call is the result of an 800 number being dialed, and send an appropriate query to SCP 101 via the appropriate one of communication links 111-112. SCP 101 is a computer based system which stores information relating to the customer's routing requirements and sends messages in response to each query to switches 102-103 in order to implement those customer requirements. For example, SCP 101 may be programmed such that all calls arriving for the particular 800 number be routed to a Los Angeles office on Monday and Tuesday, but to the New York office all other days. Alternatively, the SCP can be programmed to route calls to specific locations based upon the time of day, for example, or any other parameter. Thus, an incoming call to the 800 number causes telephone switches 102 or 103 to query the SCP, after which the SCP sends a message to the appropriate switch to effectuate call routing. The call may be routed to one of the telephones 105-110, or may be routed to one of the "other switches" indicated but not shown in FIG. 1. Moreover, different switches may be programmed to route the same 800 number to different places. Thus, callers on the east and west coasts can dial the same number, yet the east coast call will be routed to a New York office, while the west coast call will be routed to a Los Angeles office. In general, the SCP translates the logical number dialed by the caller, into the physical number, to which the call should be routed.

The SCP also provides other intelligent network services. For example, assume that SCP 101 is programmed to route the calls to one of telephones 105-110. In such a case, another function which must be included in SCP 101 is to keep track of how many of telephones 105-110 are available for incoming calls. Thus, each time SCP 101 routes a call, it updates an associated counter to reflect the fact that another one of the telephones 105-110 is in use and is thus unavailable to accept incoming calls. Each time one of the cells is disconnected via the service representative hanging up, the counter is also updated to reflect this fact. Since both switches 102 and 103 communicate in a similar manner to SCP 101, it is evident that SCP 101 should always be able to determine the total number telephones 105-110 which are available to accept incoming calls. If the SCP 101, in attempting to route a call to the corporate office 104, determines that all the telephones 105-110 are currently being used, than the appropriate one of switches 102-103 is instructed to queue that call until one of the telephones becomes available. The switches may be programmed to play a message while the call is awaiting service in the queue, so that rather than hearing a busy signal, the caller is informed that his call will be serviced shortly. In other arrangements, the call is routed to a PBX, located on the customer's premises, and the PBX either routes the call or queues it, depending upon whether or not there are any available telephone lines.

Two problems are inherent in the above described system. First, there is a finite time lag between the time that the SCP determines that there is an available telephone, and the time the switch routes the call to the corporate office. If there is only one or two available telephones, there is a substantial probability that they could both be taken off hook during this time lag; e.g. to make an outgoing call. If the switch then attempts to route an incoming call to one of these telephones, the customer will get a busy signal, an undesirable result in service oriented industries.

The second problem with the system described above is that, in addition to routing and queuing the toll free 800 calls, the switches 102-103 and telephones 105-110 are normally also used for regular telephone calls; i.e. caller billed calls. These calls arrive at the switches 102-103 at random times and are routed by the switches to other telephones or other switches, with no interaction by the SCP. Thus, while the SCP can count how many 800 calls arrive and are terminated, the counter in the SCP may not reflect the actual number of telephones 106-110 which are available, because some of these telephones may be occupied with telephone traffic that the SCP is unaware of. Consequently, the SCP may order calls queued when there are telephones available, and may order calls to be routed when there are no available telephones to route them to.

The problem remaining in the prior art is to provide IN services in a reliable and efficient manner to telecommunications customers who may also need to use regular network services.

SUMMARY OF THE INVENTION

These and other problems are overcome in accordance with the present invention which relates to a novel SCP for providing IN services in a telecommunications network. In accordance with the invention, all switches send availability information to the SCP, and this information is updated periodically, even if it changes due to factors unrelated to IN services; e.g. regular telephone traffic, a cut telephone line, or a telephone taken off hook to make an outgoing call. By updating the SCP as a result of all availability determinants, the SCP always includes current information regarding telephone availability, and only routes calls when there are actually telephones available.

In another embodiment, the novel SCP informs the switch that a telephone is available only if the SCP's counter indicates that N or more telephones are available, where N is greater than 1. By adjusting N appropriately, the probability that all N lines are taken off-hook between the time the SCP determines that a telephone is free and the time the switch routes the call to that telephone can be made negligibly small, thereby substantially eliminating the possibility that a customer receives a busy signal.

DETAILED DESCRIPTION

Figure 1:
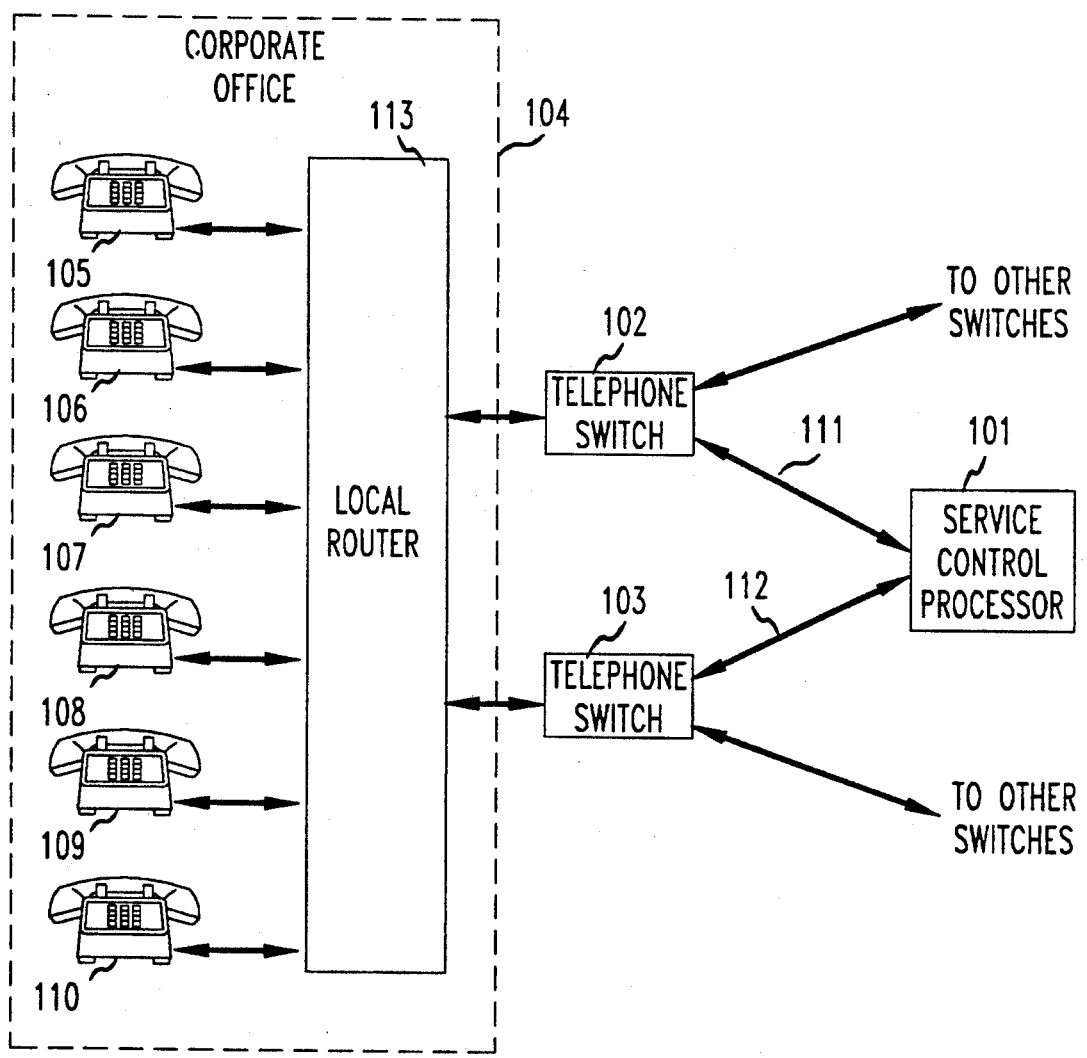
FIG. 1 is a block diagram illustrating the relationship between telecommunications equipment served by telephone switches and a service control processor, in accordance with the present invention, arranged to route incoming calls to the telecommunication equipment.
Figure 2:
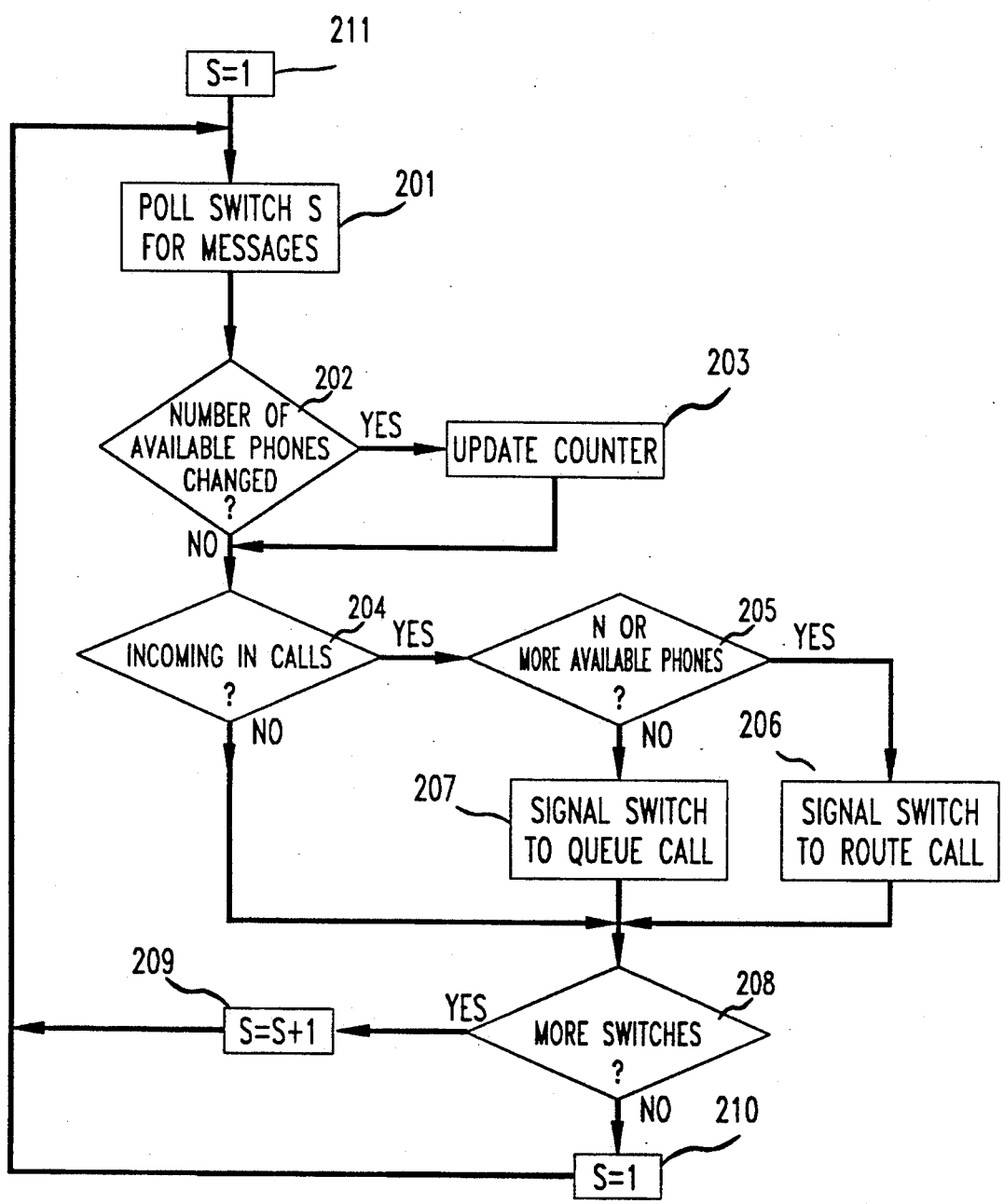
FIG. 2 is a logic flow diagram indicating the process performed in service control processor 101 of FIG. 1.

FIG. 2 shows a flow chart of an algorithm which may be implemented in the inventive SCP. The algorithm of FIG. 2 could be programmed into the SCP of FIG. 1 in order to implement the invention, or could be implemented by means of a separate peripheral device connected to the SCP of FIG. 1, with the latter implementation minimizing software changes required to the currently existing SCPs.

The flow chart of FIG. 2 is a series of operational blocks and branch points which can each be implemented by ordinarily skilled programmers as a relatively simple software module. The flow chart is intended to run as a continuing loop which executes constantly during operation of the SCP, although other implementations may be employed without departing from the scope of the invention.

In operation, the flow chart is entered at operational block 211, which sets s=1 as shown. Operational block 201 then polls switch s to read any messages arriving therefrom. For example, switch s may have an incoming IN type call, and may be querying SCP 101 for instructions as to what to do with the call, or switch s may simply be informing the SCP that another telephone has been taken off-hook.

The incoming message is processed by branch point 202, which determines if the number of available telephones for incoming calls has changed. For example, if the message received during operational block 201 indicates that a telephone has been taken off-hook, or that a call has been terminated, the number of available telephones would change. Other things which could affect the number of available telephones would be a fault in the system, or one of the lines being taken out of service for repair. If any of these conditions occur, operational block 203 would update the counter in the SCP which reflects the number of available input lines.

After the counter is updated if necessary, the message from the switch will be parsed by branch point 204 to determine if any incoming IN calls need be routed. If there are incoming IN calls to be routed, control is transferred to branch point 205 as shown in FIG. 2. Branch point 205 determines if there are at least N available telephones, such determination being based upon the counter previously discussed and included within the SCP.

The variable N is a function of many parameters in the system and is best determined empirically. For example, referring to FIG. 1, assume all of telephones 105-110 of FIG. 1 are used for outgoing as well as incoming calls. In this case, there is a substantial probability that from the time the SCP signals the telephone switch 102 or 103 to route the call, until the telephone switch 102 or 103 actually routes that call, one of the telephones may be taken off hook. Therefore, when the telephones are all used for outgoing calls as well as incoming IN services, N should be, say three. Thus, if the SCP counter shows that three or more lines are available, it will cause the telephone switch to route the call to corporate office 104, whereas if the SCP counter currently indicates that only one telephone is available, the switch 102 or 103 will be instructed to queue the call.

If, on the other hand, all of telephones 106-110 are used for incoming IN calls only, then N may be set to one or two. This is because during the time between the SCP determining that their is an available one of telephones 106-110 and the time the call actually gets routed to that telephone, the telephone will not be taken off hook since none of the telephones are used for outgoing calls. Consequently, N can be a smaller number than in the prior situation, when all of the telephone are also used for outgoing calls.

Returning to the discussion of FIG. 2, if branch point 205 determines that N or more of telephones 106-110 are available for incoming IN calls, control is transferred to operational block 206. Operational block 206 will send an appropriate message to the proper one of switches 102-103 in order to route the IN call to one of the telephones at corporate office 104.

If branch point 205 determines that there are not enough available telephones to handle the incoming IN call, control is transferred to operational block 207. Operational block 207 will then signal the appropriate one of switches 102-103 to queue the call until such time as a telephone becomes available. As described previously, when such a call is queued, a message is played to the caller telling him, for example, that his call will be answered shortly. When a telephone becomes available, the appropriate one of switches 102-103 will route the call accordingly.

Whether the call is queued or routed immediately to an available telephone, after SCP 101 signals the appropriate switch 102 or 103, control is transferred to branch point 208 as shown in FIG. 2. Further, even if there are no incoming calls to switch or to queue, control will still be transferred to branch point 208 as indicated in FIG. 2 by the connection from branch point 204 to branch point 208.

Branch point 208 determines if all of the switches connected to the SCP have been polled during the current polling cycle. If so, the parameter s is reset to 1 by operational block 210, thereby causing a new polling cycle to begin. If there are other switches to be polled, control is transferred to operational block 209, which increments the parameter s so that the next switch can be polled. Thereafter, control returns to operational block 201, in order to continue polling the switches for messages.

It can be appreciated from the above description that the invention provides a way of allowing IN services to coexist with regular network services, yet avoids the disadvantages present in prior arrangements. By allowing the SCP to remain informed of services other than IN services, the invention avoids delaying calls for which there is an available telephone and routing calls when there is no available telephone.

The above example has been given for illustrative purposes only and is not to be construed as limiting the scope of the invention. Other variations may be constructed by those of ordinary skill in the art without violating the scope or spirit of the invention. For example, the local router of FIG. 1 could be eliminated, and each of telephones 106-110 could be connected to one of switches 102-103 via a separate telephone line. Further, any of telephones 106-110 may be replaced with other types of telecommunications equipment, such a computers, modems, etc. The functions of the SCP may even be implemented in the telephone switches themselves, thereby eliminating the extra hardware required for the SCP.

I claim:

1. In a telecommunications system including a plurality of switches for routing incoming calls, at least one Service Control Processor (SCP) for communicating with the switches, and a plurality of telecommunications equipment coupled to the switches, the SCP including stored availability information relating to the telecommunications equipment, a method of operating the telecommunications system comprising the steps of:
   sending a query to the SCP when any of the switches receives an incoming call which is a result of predetermined numbers being dialed; and
   routing the call to said telecommunications equipment or queuing said call for later routing, as a function of said stored availability information;
   wherein said SCP is implemented in a standalone hardware arrangement different from the switches; and
   wherein said SCP includes means for sequentially polling said switches and for receiving messages and queries therefrom.

2. In a telecommunications system including a plurality of switches for routing incoming calls, at least one Service Control Processor (SCP) for communicating with the switches, and a plurality of telecommunications equipment coupled to the switches, the SCP including stored availability information relating to the telecommunications equipment, a method of operating the telecommunications system comprising the steps of:
   sending a query to the SCP when any of the switches receives an incoming call which is a result of predetermined numbers being dialed;
   routing the call to said telecommunications equipment or queuing said call for later routing, as a function of said stored availability information;
   implementing the SCP in the same hardware arrangement as at least one of the switches; and
   sequentially polling said switches and receiving messages and queries therefrom.

3. The method of claim 1 or 2 wherein the stored availability information includes a number N indicative of the amount of available telecommunications equipment.

* * * * *